US009573725B2

(12) United States Patent
Etchegary et al.

(10) Patent No.: US 9,573,725 B2
(45) Date of Patent: Feb. 21, 2017

(54) FLAT RACK FOR TRANSPORTING CARGO

(71) Applicant: Oceanex Inc., St. John's (CA)

(72) Inventors: Glenn Etchegary, St. John's (CA);
David Porter, St. John's (CA)

(73) Assignee: OCEANEX INC., St. John's (CA)

( * ) Notice: Subject to any disclaimer, the term of this patent is extended or adjusted under 35 U.S.C. 154(b) by 2 days.

(21) Appl. No.: 14/650,514

(22) PCT Filed: Dec. 12, 2012

(86) PCT No.: PCT/CA2012/001149
§ 371 (c)(1),
(2) Date: Jun. 8, 2015

(87) PCT Pub. No.: WO2014/089664
PCT Pub. Date: Jun. 19, 2014

(65) Prior Publication Data
US 2015/0367986 A1    Dec. 24, 2015

(51) Int. Cl.
*B65D 19/44* (2006.01)
*B65D 88/12* (2006.01)
(Continued)

(52) U.S. Cl.
CPC ............. *B65D 19/385* (2013.01); *B63B 25/00* (2013.01); *B63B 25/22* (2013.01);
(Continued)

(58) Field of Classification Search
CPC ............ B65D 88/129; B65D 19/00278; B65D 2519/00273; B65D 2519/00965; B65D 2519/0097; B65D 19/385; B65D 19/0069; B65D 19/44; B63B 25/22; B63B 25/00
(Continued)

(56) References Cited

U.S. PATENT DOCUMENTS 3,386,600 A     6/1968  Betjemann
3,520,256 A *   7/1970  Gutridge .............. B61D 45/006
                                            410/102
(Continued)

FOREIGN PATENT DOCUMENTS

CA          2682416          4/2011
WO        WO99/59899        11/1999
(Continued)

OTHER PUBLICATIONS

International Search Report for PCT/CA2012/001149, issued Mar. 13, 2013, 4 pages.
(Continued)

*Primary Examiner* — Michael Safavi
(74) *Attorney, Agent, or Firm* — Foley & Lardner LLP

(57) ABSTRACT

A flat rack comprising, a cargo platform for carrying a load, terminal bulkheads for enclosing the cargo platform and two intermediate bulkheads positioned between the terminal bulkheads at equal distance from the center of gravity of the flat rack. Each of the intermediate bulkheads is equipped with lifting points suitable therefore. Optionally, the distance between the intermediate bulkheads is between 20' and 40'. More specifically, the distance between the intermediate bulkheads may be 34'. A method for loading or offloading a cargo vessel loaded with a plurality of flat racks. The method comprises operating a crane adapted to lift at least one of the plurality of flat racks as described herein above.

34 Claims, 3 Drawing Sheets

(51) Int. Cl.
*B65D 19/38* (2006.01)
*B63B 25/22* (2006.01)
*B63B 25/00* (2006.01)
*B65D 19/00* (2006.01)

(52) U.S. Cl.
CPC ....... *B65D 19/0069* (2013.01); *B65D 88/129* (2013.01); *B65D 2519/00273* (2013.01); *B65D 2519/00278* (2013.01); *B65D 2519/00965* (2013.01); *Y02T 70/90* (2013.01)

(58) Field of Classification Search
USPC .......................................................... 410/52
See application file for complete search history.

(56) References Cited

U.S. PATENT DOCUMENTS

| | | | |
|---|---|---|---|
| 7,011,479 B2 | 3/2006 | Sain | |
| 7,674,087 B2 * | 3/2010 | He | B65D 88/129 206/512 |
| 7,769,221 B1 | 8/2010 | Shakes et al. | |
| 7,874,773 B2 * | 1/2011 | Awad | B65D 85/68 280/33.991 |
| 7,927,057 B2 | 4/2011 | Johnson | |
| 8,353,647 B2 | 1/2013 | Crane et al. | |
| 2004/0126205 A1 | 7/2004 | Amoss, Jr. et al. | |
| 2005/0216294 A1 | 9/2005 | Labow | |
| 2006/0269379 A1 | 11/2006 | Orr et al. | |
| 2007/0000921 A1 | 1/2007 | Butler et al. | |
| 2008/0112779 A1 | 5/2008 | Amoss, Jr. et al. | |
| 2011/0135424 A1 | 6/2011 | Amoss, Jr. et al. | |

FOREIGN PATENT DOCUMENTS

| | | |
|---|---|---|
| WO | WO 01/10747 A1 | 2/2001 |
| WO | WO 2004/041679 A1 | 5/2004 |
| WO | WO 2005/062903 A2 | 7/2005 |
| WO | WO 2006/005920 A1 | 1/2006 |
| WO | WO 2009/064178 A1 | 5/2009 |
| WO | WO 2009/153586 A1 | 12/2009 |
| WO | WO 2011/048427 A2 | 4/2011 |

OTHER PUBLICATIONS

Written Opinion for PCT/CA2012/001149, issued Mar. 13, 2013, 7 pages.

* cited by examiner

FLAT RACK FOR TRANSPORTING CARGO

CROSS-REFERENCE TO RELATED APPLICATIONS

This non-provisional patent application is a U.S. national phase entry of the PCT patent application entitled "FLAT RACK", application number PCT/CA2012/00149, filed Dec. 12, 2012, in the name of Oceanex Inc., the contents of which are incorporated herein by reference in its entirety.

TECHNICAL FIELD

The present invention relates to transportation and, more specifically, to marine shipping and ground transportation.

BACKGROUND

Marine transportation is the lowest contributor per ton to greenhouse gas emissions. Customers today are more conscious of the environment and may choose to include marine shipping in their plans rather than relying strictly on ground transportation in order to be more energy efficient and reduce the negative effects of greenhouse gases on the environment. Marine transportation also contributes to less road wear and tear and is proven to be a cheaper alternative to road transport.

For several years, attempts have been made to address challenges related to increasing vessels capacity and the needs of clients wishing to use a marine service to transport cargo that would traditionally be carried on flat bed road trailers. This cargo includes, among others, construction materials, recyclable materials (e.g., crushed cars), project cargo and other specialized freight, including cargo associated with the oil and mining industries. Generally, this cargo cannot be containerized, and therefore has historically been shipped via flat bed trailers.

The present invention addresses these challenges.

SUMMARY

A first aspect of the present invention is directed to a flat rack comprising, a cargo platform for carrying a load, terminal bulkheads for enclosing the cargo platform and two intermediate bulkheads positioned between the terminal bulkheads at equal distance from the center of gravity of the flat rack. Each of the intermediate bulkheads is equipped with lifting points suitable therefore. The flat rack may advantageously be at least partially provided in steel.

Optionally, the distance between the intermediate bulkheads may be set between 20' and 40'. In a more restrictive optional implementation, the distance between the intermediate bulkheads may be set to 34'. The lifting points may be positioned at each top corner of the intermediate bulkheads.

The terminal bulkheads and the two intermediate bulkheads may be opened bulkheads. The opened bulkheads may further have diagonal braces therewithin. The diagonal braces may form a diamond shape. The diamond shape may connect vertical stanchions of the opened bulkhead with a center beam of the cargo platform.

The lifting points may be formed by top ISO blocks positioned at the top of each stanchion of the terminal bulkheads and the two intermediate bulkheads. Bottom ISO blocks may be positioned corresponding to the top ISO blocks at the bottom of the cargo platform.

The cargo platform may have a thickness of 12". Optionally, the cargo platform may also be formed by five I-beams. The two most outer I-beams may be ganged together to form two box beams. Crossbeams to the fifth center beam may then further connect the box beams. At least two sets of diagonal stringers may further connect the I-beams. The center beam may also be reduced in depth compared to the outer beams.

The cargo platform may also be closed with fiberglass grating, which may be clipped to a support rail of the cargo platform.

The cargo platform may be fitted with multiple securing winches. Six (6) securing winches may be distributed on each side with corresponding securing loops on the opposite side.

A second aspect of the present invention is directed to a method for loading or offloading a cargo vessel loaded with a plurality of flat racks. The method comprises operating a crane adapted to lift at least one of the plurality of flat racks. The lifted flat rack is provided in accordance with the first aspect of the present invention.

BRIEF DESCRIPTION OF THE DRAWINGS

A more complete understanding of the present invention may be obtained with particular reference to the detailed description when read in conjunction with the illustrative drawings, in which.

DETAILED DESCRIPTION

A flat rack is an open container unit that has a cargo platform and a lifting frame for cellular ship loading by crane. The lifting frame is sometimes detachable from the cargo platform. Flat racks are primarily used to transport construction materials, project cargo and other specialized or over-dimensional freight, such as that used in the oil and mining industries.

A solution for providing increased capacity and versatility is a 48' flat rack that can carry cargo that could not be containerized. The exemplary 48' flat rack has a 24" thick steel cargo platform, which increases the weight of the flat rack. Lifting posts are positioned on each side of the cargo platform, 40' apart. The 48' flat rack has a restrictive carrying capacity and a cargo area of 47'6" long and 7'2" wide. These dimensions limit the ability to carry many types of freight because of weight and spatial capacity. The 48' flat rack can be attached to a trailer to provide an intermodal solution. However, the weight of the 48' flat rack itself limits the amount of cargo that can be loaded thereon for the final weight to be within the legal limit for ground shipping.

Figure 1:
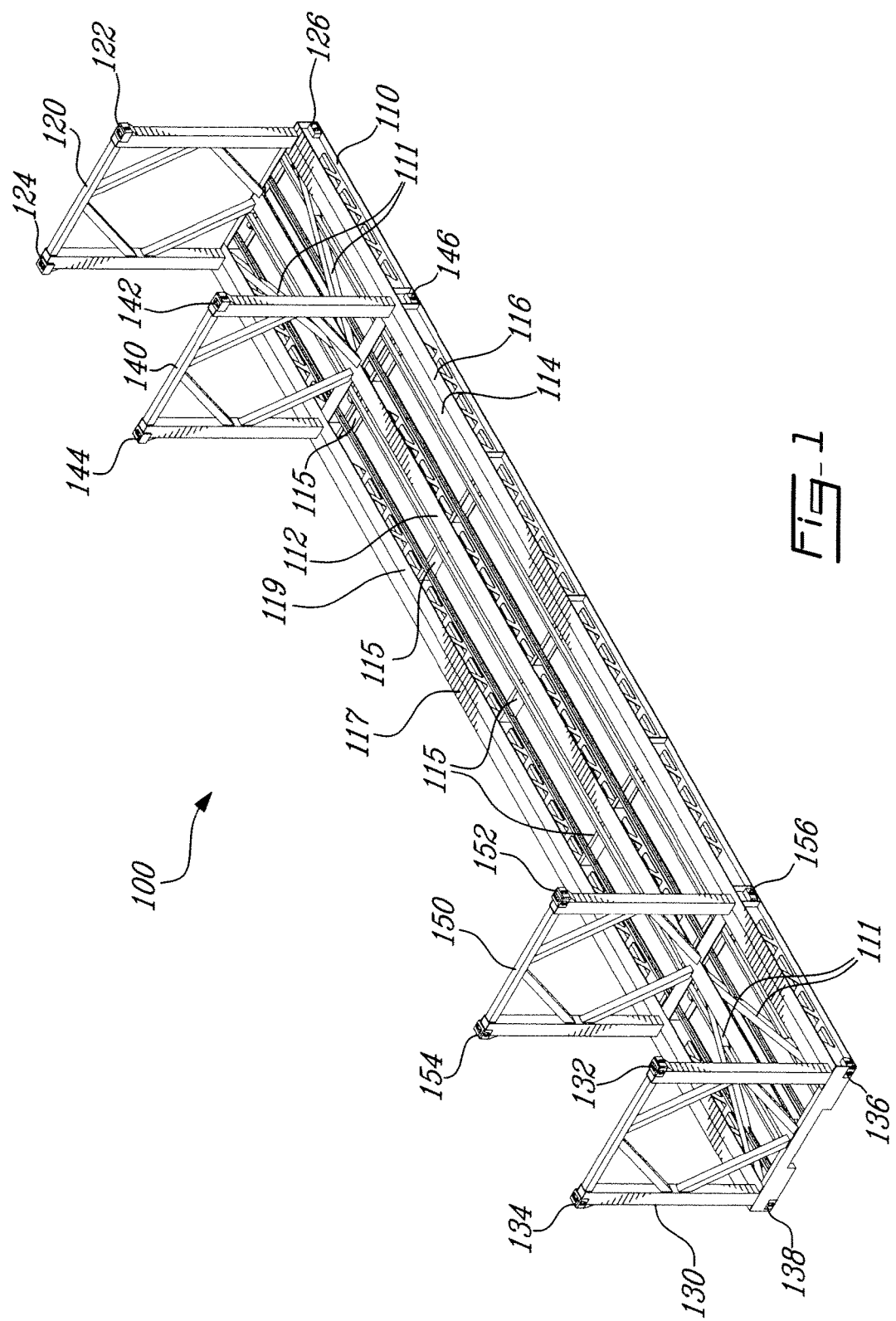
FIG. 1 is a perspective view of an exemplary flat rack in accordance with the teachings of the present invention.

Reference is now made to FIG. 1, which shows a perspective view of an exemplary flat rack 100 in accordance with the teachings of the present invention. The flat rack 100 comprises a cargo platform 110 for carrying a load, terminal bulkheads 120 and 130 for enclosing the cargo platform 110 and two intermediate bulkheads 140 and 150 positioned between the terminal bulkheads 120 and 130 at equal distance from the center of gravity of the empty flat rack 100. Each of the intermediate bulkheads 140 and 150 are equipped with lifting points (142, 144, 152 and 154) suitable therefor.

The flat rack 100 of the preferred embodiment has the following par external dimensions:
- Length: 16,154 (0, −25)mm or 53' (0, −1")
- Width: 2,591 (0, −13)mm or 8'6" (0, −½")
- Height: 2,896 (0, −25)mm or 9'6" (0, −1")

Skilled readers will readily understand that the tolerancing mentioned above is only illustrative.

The flat rack 100 is provided to correct some problems associated with the 48' flat rack. The flat rack 100 is meant to be road transported on chassis and to be loaded onto ships for transportation at sea. In comparison to the 48' flat rack, the flat rack 100 allows for greater loading efficiency by removing the lifting posts. The flat rack 100, in the exemplary 53' configuration of the preferred embodiment, is designed to sustain a maximum carrying capacity of at least 64,000 pounds with a cargo area of 53' long, 8'6" wide and 8'6" high. The flat rack 100 of the preferred embodiment may be designed in accordance with the teachings of the present invention to weigh no more than 16,000 pounds. In comparison to the 48' flat rack, the flat rack 100, with its exemplary 8'6" width, allows to carry two pallets side by side, which is currently not possible with the existing design. The exemplary 53' configuration of the flat rack 100 also provides additional length that further increases its carrying capacity, thus allowing them to compete with 48' and 53' trailers and hibeds. In the preferred embodiment, the flat rack 100 also has staking capability, up to four units high, which enhances spatial utilization in terminals and on vessels and, as such, provides enhanced flexibility. The staking capability is particularly relevant to cellular vessels.

In the preferred embodiment of the flat rack 100, the distance between the intermediate bulkheads 140 and 150 is between 20' and 40' and, even more preferably, the distance between the intermediate bulkheads 140 and 150 is 34'. The 34' distance between the intermediate bulkheads 140 and 150 provides a particular advantage to some industries that provide loads in multiples of 8' (e.g., logs or palletted loads). The intermediate bulkheads 140 and 150, in the preferred embodiment of the flat rack 100, are fixed in place during construction of the flat rack 100 and are not expected to be moved during its lifetime. Fixing the intermediate bulkheads 140 and 150 provides exemplary advantages such as a stronger assembly during construction and lowered maintenance costs during use (e.g., no mobile parts).

In one optional embodiment, extra braces (not shown) may be used to help maintain squareness of the intermediate bulkheads 140 and 150 and/or the terminal bulkheads 120 and 130. The extra braces may hinder versatility of the flat rack 100 to accept certain loads and may therefore not be appropriate in all circumstances. Various configurations of the extra braces may be chosen to help minimize the disadvantages. For instance, the extra braces may be used only along one side of the flat rack 100. The extra braces may also be used only on the intermediate bulkheads 140 and 150 and/or only toward the center of the flat rack 100 (e.g., only affecting the center load section). Conversely, the extra braces may be used only between the intermediate and terminal bulkheads. Some or all of the extra braces could also be temporary. Temporary extra braces could be used only during certain loading or unloading operations or during transportation of certain loads (e.g., based on equipment used to move the flat rack 100, based on load weight and/or inconveniences for certain loads). Skilled readers will readily understand that these are exemplary configurations that could be combined in different ways and that other configurations of the extra braces could also be made.

In the preferred embodiment of the flat rack 100, the lifting points are positioned at each top corner of the intermediate bulkheads. The lifting points (142, 144, 152 and 154), in the preferred embodiment, are ISO blocks positioned at the top of each stanchion the two intermediate bulkheads 140 and 150. Additional ISO blocks (122, 124, 132 and 134) may also be positioned at the top of each stanchion of the terminal bulkheads 120 and 130. The top ISO blocks may be offset on the stanchions (as shown in the example of FIG. 1), e.g., in order to provide proper position and alignment. Bottom ISO blocks (126, 136, 138, 146 and 156, others not visible on the perspective view of FIG. 1) corresponding to the lifting points (122, 124, 132, 134, 142, 144, 152 and 154) may also be positioned at the bottom of the cargo platform 110. The flat rack 100 of the preferred embodiment is designed for road transportation on skeletal chassis (not shown). In that configuration, the flat rack 100 is secured through the bottom ISO blocks (e.g., twist locks or equivalent) at bottom corner fittings of 34' (146 and 156, others not visible on the perspective view of FIG. 1) or 53' (126, 136 and 138, other not visible on the perspective view of FIG. 1) position. The bottom ISO blocks (126, 136, 138, 146 and 156) may be recessed in the structure of the cargo platform 110.

Figure 2B:
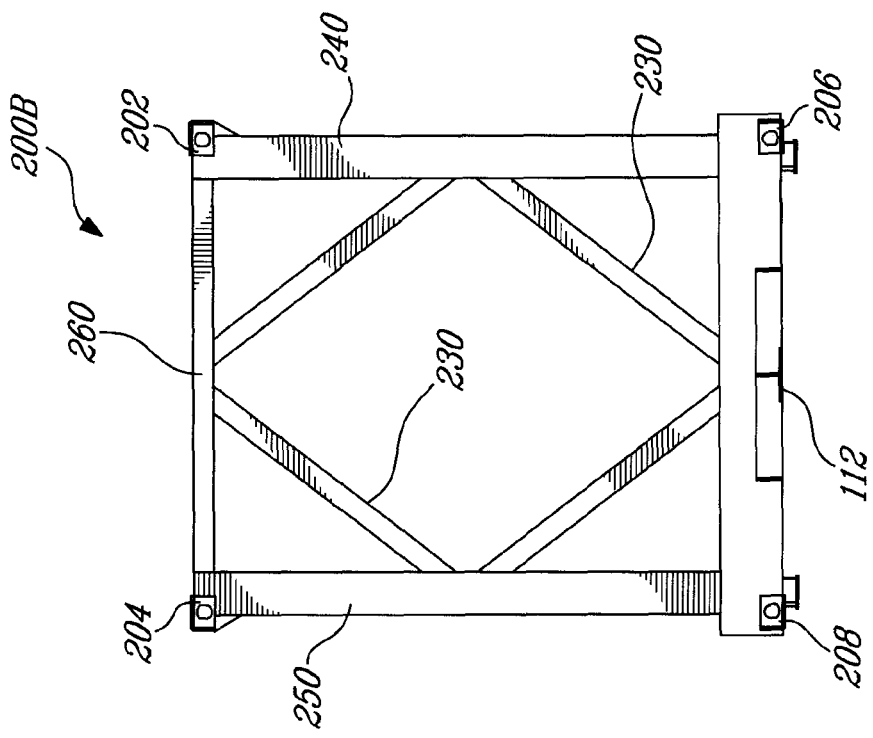
FIG. 2 is a right side view of an exemplary flat rack in accordance with the teachings of the present invention.
Figure 2A:
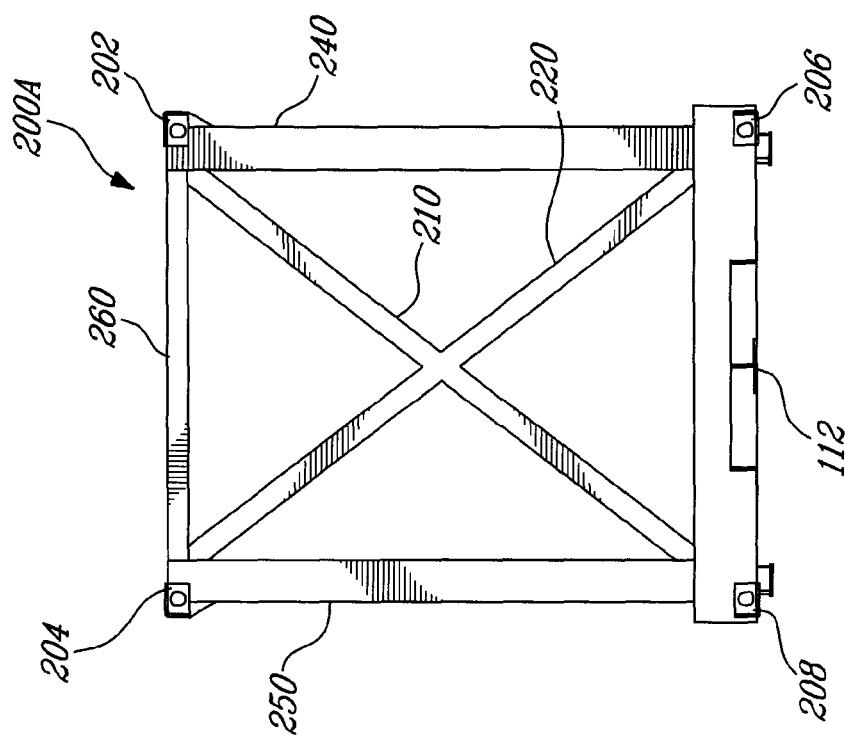

The terminal bulkheads 120 and 130 and/or the two intermediate bulkheads 140 and 150 may be opened bulkheads (in comparison with full bulkhead), as exemplified on FIG. 1. A mix of opened and full bulkheads may also be provided (not shown). Reference is now concurrently made to FIG. 1 and FIG. 2A and FIG. 2B, referred to together as FIG. 2, which show a different right side views of exemplary opened bulkheads 200A, 200B in accordance with the teachings of the present invention. The open bulkheads 200A, 200B may be constructed as units and installed on the completed cargo platform 110. The opened bulkheads 200A, 200B have diagonal braces (e.g., 4×4×¼") 210 and 220, or 230 therewithin that connect to vertical stanchions 240 and 250 (e.g., 6×8×⅜") and a horizontal top cross member 260 (e.g., 4×4×¼") of the opened bulkhead 200A or 200B. The diagonal braces 210 and 220 of the open bulkhead 200A form a "X" shape while the diagonal braces 230 of the open bulkhead 200B form a diamond shape. The diamond shape 230 provides supplemental stability, which may be advantageous or required in certain circumstances, especially if a center beam 112 of the cargo platform 110 is used; the diamond braces 230 being able to connect therewith. The vertical stanchions 240 and 250 may be capped, for instance with ISO corner fittings 202, 204, 206 and 208.

In the preferred embodiment of the flat rack 100, the cargo platform 110 has a thickness of 12". The cargo platform 110 is formed by five longitudinal I-beams (112, 114, 116, 117, and 119). Two most outer I-beams may be ganged (e.g., two W 12×40 lb) together to form two box beams, for instance, 16" wide by 12" (114-116 and 117-119). Crossbeams 115 to the fifth center beam 112 (e.g., W 12×53 lb) may then connect the box beams (114-116 and 117-119). For instance, the crossbeams 115 may be C8×11.5 cross beams and end structures may be formed by C12×30 beams. The crossbeams 115 may be placed at approximately 96" centers. The I-beams 114-116, 117-119 and 112 may further be connected with at least two sets of diagonal stringers 111 (e.g., 4×4×¼" hollow structural steel ("HSS")). The I-beams 114-116, 117-119 and 112 may also further present side openings (e.g., to reduce their weight) while maintaining required structural characteristics. The openings may be made throughout the length of all I-beams 114-116, 117-119 and 112 (as shown), but may also be made only on certain beams and/or only on certain sections of all or specific beams.

If the flat rack 100 is to be used on a chassis for ground transportation, then at least one of its ends needs to be adapted to fit thereon. For instance, the center beam 112 and the platform 110 may need to be modified. In the configuration shown on FIG. 1, channels are present at both ends of the flat rack 100 to fit on the chassis. Each channel is formed by an opening in the platform 110 below the terminal bulkheads 120 and 130, and by reducing the depth of the center beam 112 along each channel. The example of FIG. 1 shows the flat rack 100 with identical channels at both ends. This example, combined to the identical terminal bulkheads 120 and 130, allows the flat rack 100 to be reversible on the chassis. The reversibility of the flat rack 100 provides the exemplary advantage of simplifying loading operations to the chassis. Of course, skilled readers will appreciate that a flat rack having only one adapted end would also fit on the chassis and could also be preferable in certain circumstances (e.g., imbalanced loads).

Alternatively, the cargo platform 110 may still have a thickness of 12", but be formed by three I-beams (not shown). The platform 110 and the center beam 112 may also be adapted to fit on a chassis (e.g., at one end or both end to provide reversibility as described above).

The cargo platform 110 may be closed with fiberglass grating (not shown) such as a 1" fiberglass grating supported by two channel sections. The fiberglass grating may be clipped to a support rail (not shown) of the cargo platform 110. Depending on the expected load, the grating may not be needed. Alternatively, a wood grating (e.g., hard wood or composite), a composite material grating or a plastic grating (e.g., high density) could also be used. Different gratings could also be used on different sections of the flat rack 100. The cargo platform 110 is also likely to be fitted with multiple securing winches (not shown). In the preferred embodiment of the flat rack 100, six securing winches are distributed on each side with corresponding securing loops on the opposite side.

Figure 3:
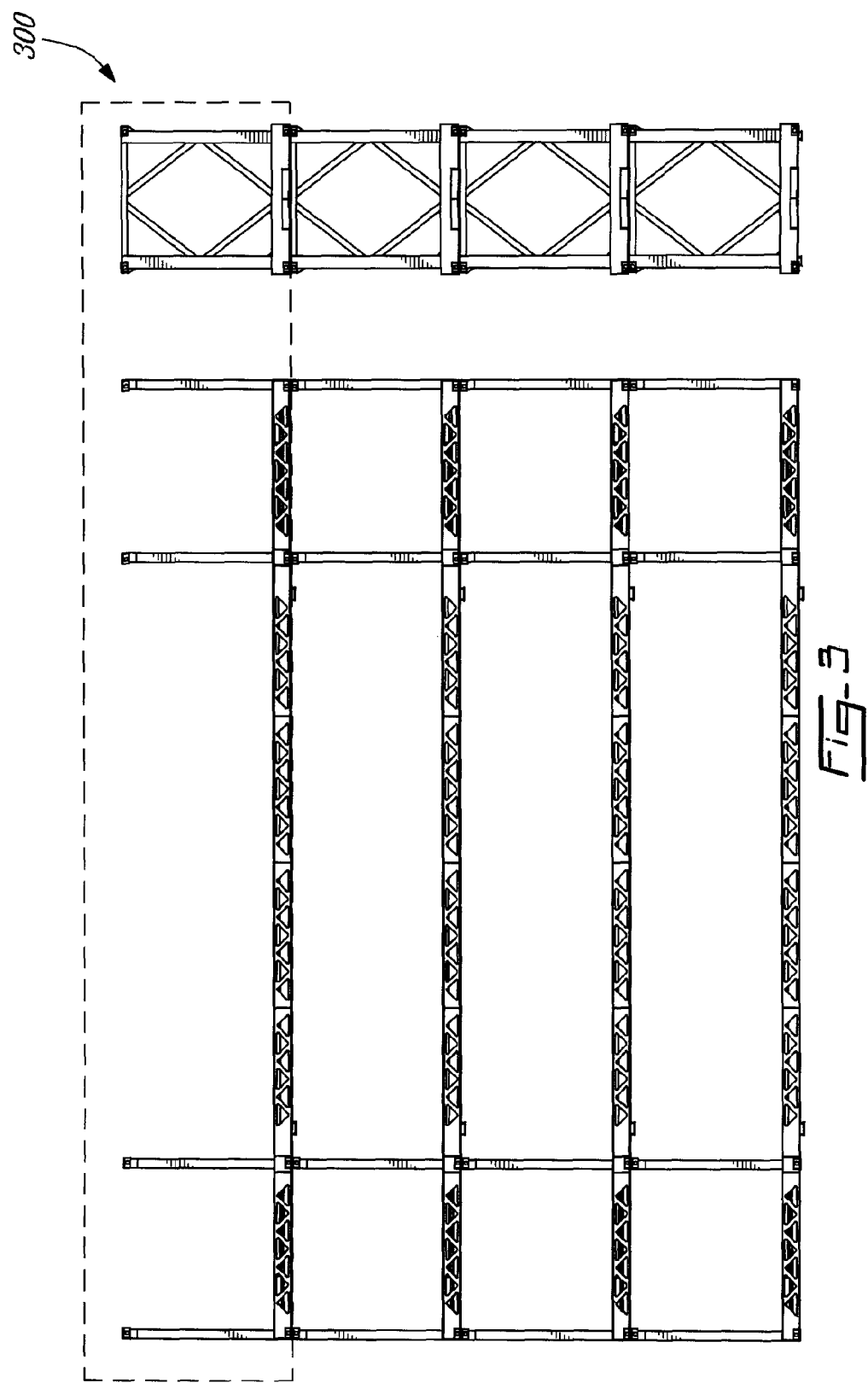
FIG. 3 is a side view of an exemplary stack configuration of flat racks in accordance with the teachings of the present invention.

FIG. 3 shows an exemplary stacking configuration 300 of the flat rack 100 of the preferred embodiment that is of particular relevance for marine transportation. The stacking configuration 300 shows four (4) flat racks 100 high staked with pins placed at the foot corner positions (e.g., 53 foot position) (expected maximum gross weight 25,522 kg per flat rack). The stacking configuration 300 may also have three (3) flat rack 100 high stacked with pins placed at the foot corner positions (e.g., 53 foot position) (expected maximum gross weight 34029 kg per flat rack). In the stacking configuration 300, the stacked flat racks 100 are expected to be secured by suitable vertical and diagonal wire lashings (not shown) (expected maximum gross weight 30,480 kg).

The following is an exemplary welding schedule that is expected to be followed:

1. Plate caps and beam web stiffeners ¼" fillet weld all around.
2. W12×40 beams welding of flanges together butt weld from one side ½" throat depth edge beveling on both flanges.
3. Cross beams and racking stringers to main beams. ¼" fillet weld all around.
4. End channels and cross beams at 34-foot lifting areas to main beams. ⅜" fillet weld all around
5. Stanchions & diagonals in open bulkheads. ¼" fillet weld all around
6. Open bulkheads to main beams ⅜ fillet weld all around 7. Corner castings to main beams & stanchions ½" fillet weld all around All fillet weld sizes refer to throat thickness.

It is expected that the entire steel surface, prior to forming or after, will have to be degreased and shot blasted to Standard SA 2.5 to obtain the surface roughness at 25 to 35 microns which can result in the removal of all the rust, dirt, mill scale and all other foreign materials. The entire steel surface may be coated with primer paint immediately after shot blasting. All the weld joints may be shot blasted to remove all the welding fluxes, spatters, burnt primer coatings caused by welding heat, and other foreign materials, and followed with the secondary paint operation immediately.

In the preferred embodiment of the flat rack 100, the plate material used is stainless steel, the plate treatment is a chemically etched & enameled and the rivets are made of stainless steel. The plate thickness is 0.8 mm.

The 53' flat rack of the preferred embodiment is designed and constructed for domestic carriage of freight by road and ship transport. In the preferred embodiment, all materials used in the construction is able to withstand temperature ranging from −40° C. (−40° F.) to 80° C. (176° F.) without effect on the 53' flat rack's strength.

In the preferred embodiment, the 53' flat rack 100 complies with the following standards in their respective edition available as of the filing date of the present application, unless particularly specified:

1) I.S.O./TC-104 (in part)

668—Series 1 freight containers-classification, external dimensions and ratings

6346—Coding, identification and marking for freight containers

1161—Specification of corner fittings for series 1 freight containers

1496/1—Specification and testing of series 1 freight containers

Part 1: General cargo containers for general purposes

830—Freight containers-Terminology.

2) The Customs Convention on the International Transport of Goods (T.I.R.).

3) The International Convention for Safe Containers (CSC).

4) All other applicable rules and regulations.

In order to be compliant with appropriate standards and for security reasons, no part of the exemplary flat rack 100 is expected to protrude out beyond the external dimensions mentioned above. The 53' and 34' position top, and bottom handling fittings are both with apertures at 2,261 mm (89") centers. Skilled persons will recognize that these limitations do not affect the innovative teachings of the present invention.

The present invention also relates to a method for loading or offloading a cargo vessel loaded with a plurality of flat racks as exemplified hereinabove. The method comprises operating a crane adapted to lift at least one of the plurality of flat racks. Skilled person will understand that other equipment such as gantry cranes, grappler lifts, reach stackers, forklift trucks, stack lifters, etc. could also be used.

Identical reference numerals are used throughout different views to identify similar or identical elements. Figures are not necessarily drawn to scale. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A flat rack comprising:
a cargo platform for carrying a load;
terminal bulkheads for enclosing the cargo platform, the terminal bulkheads being opened bulkheads having diagonal braces therewithin; and
two intermediate bulkheads positioned between the terminal bulkheads at equal distance from the center of gravity of the flat rack, each of the intermediate bulkheads being equipped with lifting points suitable therefor, the intermediate bulkheads being opened bulkheads having diagonal braces therewithin.

2. The flat rack of claim 1, wherein the distance between the intermediate bulkheads is between 20' and 40'.

3. The flat rack of claim 1, wherein the distance between the intermediate bulkheads is between 33' and 34'.

4. The flat rack of claim 3, wherein the lifting points are positioned at each top corner of the intermediate bulkheads.

5. The flat rack of claim 1, wherein the diagonal braces form a X shape.

6. The flat rack of claim 5, wherein the X shape connects the four corners of the opened bulkhead.

7. The flat rack of claim 1, wherein top ISO blocks are positioned at the top of each stanchion of the terminal bulkheads and the two intermediate bulkheads.

8. The flat rack of claim 7, wherein bottom ISO blocks corresponding to the top ISO blocks are positioned at the bottom of the cargo platform.

9. The flat rack of claim 1, wherein the cargo platform has a thickness of 12".

10. The flat rack claim 9, wherein the cargo platform is formed by five I-beams.

11. The flat rack of claim 10, wherein the two most outer I-beams are ganged together to form two box beams.

12. The flat rack of claim 10, wherein the box beams are connected by crossbeams to the fifth center beam.

13. The flat rack claim 1, wherein the cargo platform is formed by five I-beams connected with at least two sets of diagonal stringers.

14. The flat rack claim 1, wherein the cargo platform has a thickness of 12" and is formed by at least three I-beams, the center beam being reduced in depth compared to the outer beams.

15. The flat rack of claim 1, wherein the cargo platform is closed with fiberglass grating.

16. The flat rack of claim 15, wherein the fiberglass grating is clipped to a support rail of the cargo platform.

17. The flat rack of claim 1, wherein the cargo platform is fitted with multiple securing winches.

18. The flat rack of claim 17, wherein six securing winches are distributed on each side with corresponding securing loops on the opposite side.

19. A flat rack comprising:
a cargo platform for carrying a load, wherein the cargo platform is formed by at least three I-beams, the center beam being reduced in depth compared to the outer beams;
terminal bulkheads for enclosing the cargo platform; and
two intermediate bulkheads positioned between the terminal bulkheads at equal distance from the center of gravity of the flat rack, each of the intermediate bulkheads being equipped with lifting points suitable therefor.

20. The flat rack of claim 19, wherein the center beam is reduced in depth to fit over a chassis for ground transportation.

21. The flat rack of claim 20, wherein the center beam is reduced in depth along a channel formed at both ends of the cargo platform, thereby ensuring reversibility of the flat rack over the chassis.

22. The flat rack of claim 21, wherein the distance between the intermediate bulkheads is between 33' and 34'.

23. The flat rack of claim 22, wherein the lifting points are positioned at each top corner of the intermediate bulkheads.

24. The flat rack of claim 23, wherein the terminal bulkheads and the two intermediate bulkheads are opened bulkheads.

25. The flat rack of claim 24, wherein the opened bulkheads have diagonal braces therewithin.

26. The flat rack of claim 25, wherein the diagonal braces form a X shape.

27. The flat rack of claim 26, wherein the X shape connects the four corners of the opened bulkhead.

28. The flat rack of claim 21, wherein top ISO blocks are positioned at the top of each stanchion of the terminal bulkheads and the two intermediate bulkheads.

29. The flat rack of claim 28, wherein bottom ISO blocks corresponding to the top ISO blocks are positioned at the bottom of the cargo platform.

30. The flat rack of claim 21, wherein the cargo platform has a thickness of 12".

31. The flat rack claim 30, wherein the cargo platform is formed by five I-beams.

32. The flat rack of claim 31, wherein the two most outer I-beams are ganged together to form two box beams.

33. The flat rack of claim 32, wherein the box beams are connected by crossbeams to the fifth center beam.

34. The flat rack claim 21, wherein the cargo platform is formed by five I-beams connected with at least two sets of diagonal stringers.

* * * * *